Oct. 4, 1927.

E. H. RATHBUN 1,644,033

PRINTER'S COMPOSING STICK

Filed Dec. 2, 1925

Inventor

E. H. Rathbun

By Clarence A. O'Brien

Attorney

Patented Oct. 4, 1927.

1,644,033

UNITED STATES PATENT OFFICE.

EDWARD H. RATHBUN, OF MITTINEAGUE, MASSACHUSETTS.

PRINTER'S COMPOSING STICK.

Application filed December 2, 1925. Serial No. 72,706.

This invention relates to printers' composing sticks and has more particular reference to an improvement in the locking device of said stick, the same being so constructed as to allow the stick to lie flat on the bottom of the pan or stand on the back wall without any of its movable parts interfering with its so lying flat or standing upon its back.

Generally the invention consists primarily in a locking device within the movable knee having a longitudinal flange attached to and made a part of the inside back wall of the stick in such a manner that the knee will not slip, tip or spread.

A further and important object is to provide a printer's composing stick wherein the knee may be readily maintained in adjusted position with respect to the stick and this in a relatively quick and easy manner.

With the foregoing and other objects in view as the nature of the invention will be better understood, the same comprises the novel form, combination and arrangement of parts hereinafter more fully described and shown in the accompanying drawings and claim.

In the drawing wherein like reference characters indicate corresponding parts throughout the several views.

Figure 1:
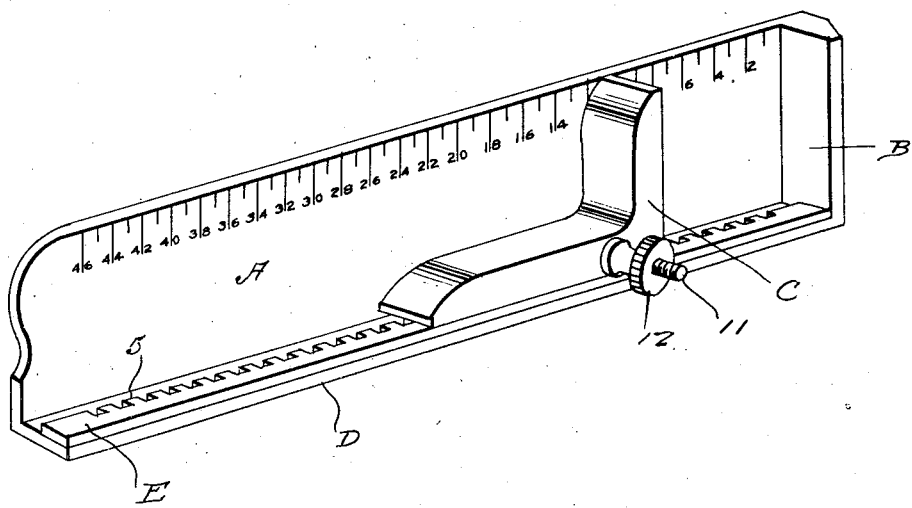
Figure 1 is a perspective of my improved composing stick.
Figure 2:
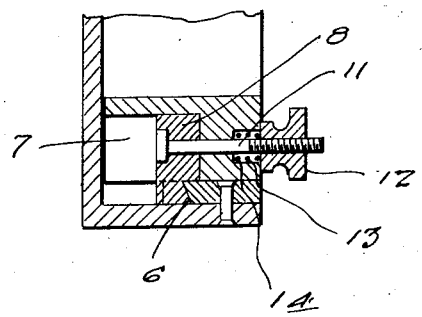
Fig. 2 is an enlarged fragmentary section taken transversely through the stick, and the adjustable knee for more clearly disclosing the locking device, or construction.
Figure 3:
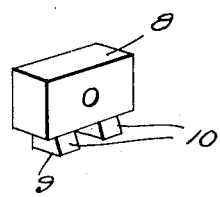
Fig. 3 is a perspective of a dog member that effects the principal part of said locking device.

Now having particular reference to the drawing, A designates the pan of the stick, B the stationary end wall thereof, C the movable knee adapted for sliding movement upon the back wall D, upon the top side and at the outer edge of which is a flat-like strip E, the inner edge of which is toothed as at 5, the portions of the strip between the teeth being beveled as at 6, Fig. 2.

The horizontal portion of the knee or movable part C is formed in its under surface and at its inner edge with a rectangular shaped notch 7 within which is slidably disposed a rectangular shaped dog 8, the lower surface of which carries spaced teeth 9—9, two or more in number, the forward edges of which are beveled as at 10, complementary to the bevel of the portions of the strip E intermediate said teeth 5, in order that when the dog 8 is moved forwardly within the notch 7 of the horizontal portion of said knee and there maintained in a manner hereinafter described, a vertical movement of the knee will be impossible, said teeth of the dog and strip further serving to prevent longitudinal movement of the knee.

Disposed through registering openings in said dog 8 and the horizontal portion of the knee is a headed and screw threaded bolt 11 upon the projected threaded end of which is a thumb nut 12 which when screwed upwardly upon the bolt, will firmly maintain the dog forwardly within the notch 7 and consequently the teeth 9—9 between complementary ones of the teeth 5 of the strip E.

The longitudinal portion of the knee C directly in back of the thumb nut 12 is socketed as at 13 and surrounding the bolt within said socket is an expansible helical spring 14 which at all positions of the thumb nut upon the bolt serves normally to maintain the dog 8 in proper locking position, but when the nut is partially unscrewed, pressure upon the same will reduce the dog and allow the knee to be moved to desirable adjusted position with respect to the pan of the stick.

From the foregoing description when considered in conjunction with the accompanying drawings, it will at once be apparent that I have provided a highly novel, simple and efficient form of printer's composing stick of such nature as to allow the stick to lie flat on the bottom of the pan or stand on the back wall without any of its movable parts interfering with its so lying flat or standing upon its back and also for preventing any slipping, tipping or spreading of the knee with respect to the stick.

Minor changes may be made in the invention without departing from the spirit or scope of the appended claim.

Having thus described my invention, what I desire to secure by Letters Patent is:

In a composing stick of the class described, a pan, end and back walls, a strip secured on the upper inner portion of the back wall, said strip having notches formed in the lower edge thereof, a knee slidable along the strip and said back wall, the inner portion of the knee being provided with a transverse cut out portion, a dog slidable in the cut out portion, teeth depending from said dog and adapted to engage in said notches for locking the knee against sliding movement, and means for normally holding the dog forwardly in the cut out portion of the knee, said means comprising a bolt attached at its inner end to the dog, the threaded end of the said bolt extending through the forward side of the knee, the forward side of the knee having a socket formed therein around the opening through which the threaded end of the bolt extends, a thumb nut threaded on the outer threaded end of the bolt, and an expansible spring disposed within the socket and bearing against the inner face of the nut.

In testimony whereof I affix my signature.

EDWARD H. RATHBUN.